(12) United States Patent
Melzer et al.

(10) Patent No.: US 11,899,125 B2
(45) Date of Patent: Feb. 13, 2024

(54) AUTOMATIC INTERFERENCE DETECTION AND AVOIDANCE IN RADAR TRANSCEIVER SYSTEMS

(71) Applicant: Infineon Technologies AG, Neubiberg (DE)

(72) Inventors: Alexander Melzer, Neutillmitsch (AT); Rainer Findenig, Linz (AT)

(73) Assignee: Infineon Technologies AG, Neubiberg (DE)

( * ) Notice: Subject to any disclaimer, the term of this patent is extended or adjusted under 35 U.S.C. 154(b) by 225 days.

(21) Appl. No.: 17/506,048

(22) Filed: Oct. 20, 2021

(65) Prior Publication Data
US 2023/0118317 A1    Apr. 20, 2023

(51) Int. Cl.
*G01S 7/28* (2006.01)
*G01S 13/50* (2006.01)
*G01S 7/02* (2006.01)

(52) U.S. Cl.
CPC .......... *G01S 7/2813* (2013.01); *G01S 7/0232* (2021.05); *G01S 13/50* (2013.01)

(58) Field of Classification Search
CPC ........ G01S 13/34; G01S 13/50; G01S 7/2813; G01S 7/0232
See application file for complete search history.

(56) References Cited

U.S. PATENT DOCUMENTS

2008/0231497 A1* 9/2008 Sakamoto ............. G01S 13/345
342/159

* cited by examiner

*Primary Examiner* — Rahel Guarino
(74) *Attorney, Agent, or Firm* — Harrity & Harrity, LLP (57) ABSTRACT

A radio frequency (RF) circuit includes an input terminal configured to receive a reception signal from an antenna; an output terminal configured to output a digital output signal; a receive path including a mixer and an analog-to-digital converter (ADC), wherein the receive path is coupled to and between the input and output terminals, wherein the receive path includes an analog portion and a digital portion, and wherein the ADC generates a digital signal based on an analog signal received from the analog portion; a test signal generator configured to generate an analog test signal injected into the analog portion of the receive path; and a digital processor configured to receive a digital test signal from the digital portion, the digital test signal being derived from the analog test signal, analyze a frequency spectrum of the digital test signal, and determine a quality of the digital test signal.

24 Claims, 6 Drawing Sheets

AUTOMATIC INTERFERENCE DETECTION AND AVOIDANCE IN RADAR TRANSCEIVER SYSTEMS

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. Radar sensors may also be used in as well as autonomous driving features. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or baseband signals (e.g., filters, amplifiers, etc.), and the analog-to-digital conversion in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

With more and more vehicles to be equipped with radar sensors, interference in frequency modulated continuous wave (FMCW) radar systems is expected to become a predominant issue. The basic problem is that all automotive radar devices emit electromagnetic waves in the same frequency range (currently 76-81 GHz). Thereby, the radar sensors potentially interfere with each other. It turns out that the noise floor of radar devices can be severely affected by this interference. Thus, objects may be covered in this noise caused by interference, which makes their detection temporarily impossible. Also, under certain conditions, the interference may lead to ghost targets. Ultimately, advanced driver assistance systems and autonomous driving systems may react delayed or even wrongly due to the occurring interference. Therefore, an improved radar system capable of autonomously detecting and avoiding interference may be desirable.

SUMMARY

Embodiments provide a method for, a device, and a system for interference monitoring of external interference radio frequency (RF) signals received from an external environment (e.g., from free space).

Embodiments provide a radar semiconductor chip including: a ramp signal generator configured to generate a frequency-modulated ramp signal within a predefined radar frequency range, the frequency-modulated ramp signal comprising a plurality of frequency ramps each starting at a respective ramp start frequency and ending at a respective ramp stop frequency, wherein the respective ramp start frequencies and the respective ramp stop frequencies of the plurality of frequency ramps define a first frequency range; a transceiver configured to receive at least one radio frequency (RF) signal from an antenna, the transceiver comprising an interference detection circuit configured to detect an external interference signal included in the at least one RF signal, the external interference signal being within the predefined radar frequency range; and a controller configured to autonomously adjust at least one ramp parameter based on the detected external interference signal and autonomously transmit the at least one adjusted ramp parameter to a microcontroller.

Embodiments provide a system that includes the radar semiconductor chip.

Embodiments provide a method of detecting external interference signals in a radio frequency (RF) circuit. The includes: generating, by a radar semiconductor chip, a frequency-modulated ramp signal within a predefined radar frequency range, the frequency-modulated ramp signal comprising a plurality of frequency ramps each starting at a respective ramp start frequency and ending at a respective ramp stop frequency, wherein the ramp start frequencies and the ramp stop frequencies of the plurality of frequency ramps define a first frequency range; receiving, by the radar semiconductor chip, at least one RF signal from an antenna; detecting, by the radar semiconductor chip, an external interference signal included in the at least one RF signal, the external interference signal being within the predefined radar frequency range; autonomously adjusting, by the radar semiconductor chip, at least one ramp parameter based on the detected external interference signal; and autonomously transmitting, by the radar semiconductor chip, the at least one adjusted ramp parameter to a microcontroller.

BRIEF DESCRIPTION OF THE DRAWINGS

Embodiments are described herein making reference to the appended drawings.

DETAILED DESCRIPTION

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a DSP that performs some processing on the digital signal.

Embodiments are discussed below in the context of a radar system. It should be noted, however, that the described embodiments may also be applied in applications different from radar such as, for example, RF transceivers of RF communication devices.

Figure 1:
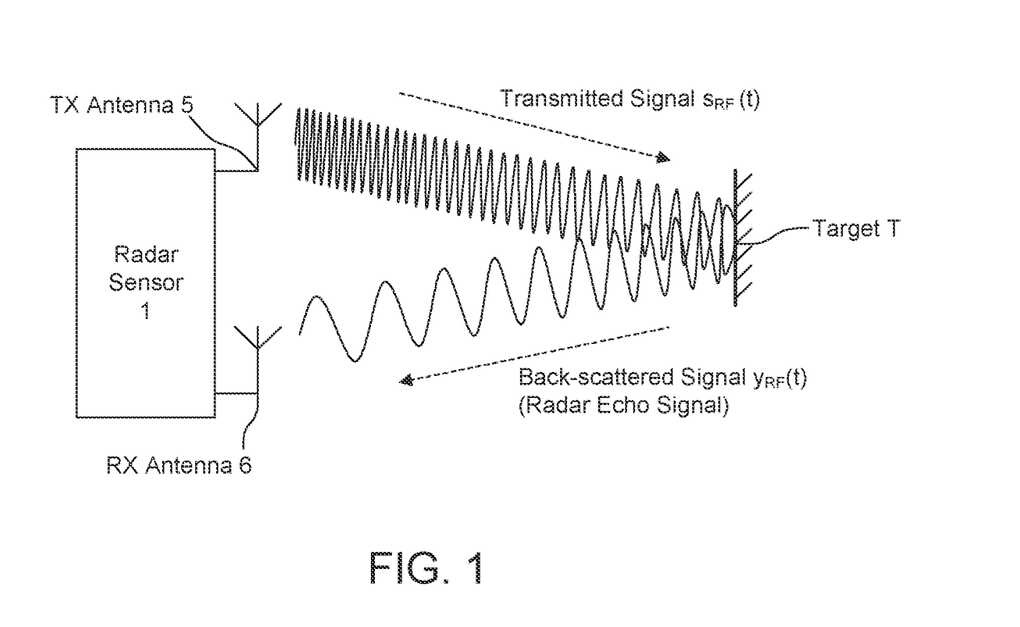
FIG. 1 is a drawing illustrating the operating principle of a frequency-modulated continuous-wave (FMCW) radar system for distance and/or velocity measurement according to one or more embodiments.

FIG. 1 illustrates a frequency-modulated continuous-wave (FMCW) radar system 1. In the present example, separate transmission (TX) and reception (RX) antennas 5 and 6, respectively, are used. However, it is noted that a single antenna can be used so that the transmission antenna and the reception antenna are physically the same (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna continuously radiates an RF signal $S_{RF}(t)$, which is frequency-modulated, for example, by a periodic linear frequency ramp signal (also referred to as frequency sweep or chirp signal). The transmitted signal $S_{RF}(t)$ is back-scattered at a target T, which is located in the radar channel within the measurement range of the radar device. The back-scattered signal $y_{RF}(t)$ is received by the reception antenna 6 as a radar echo. In the depicted example, the back-scattered signal is denoted as $y_{RF}(t)$.

Figure 2:
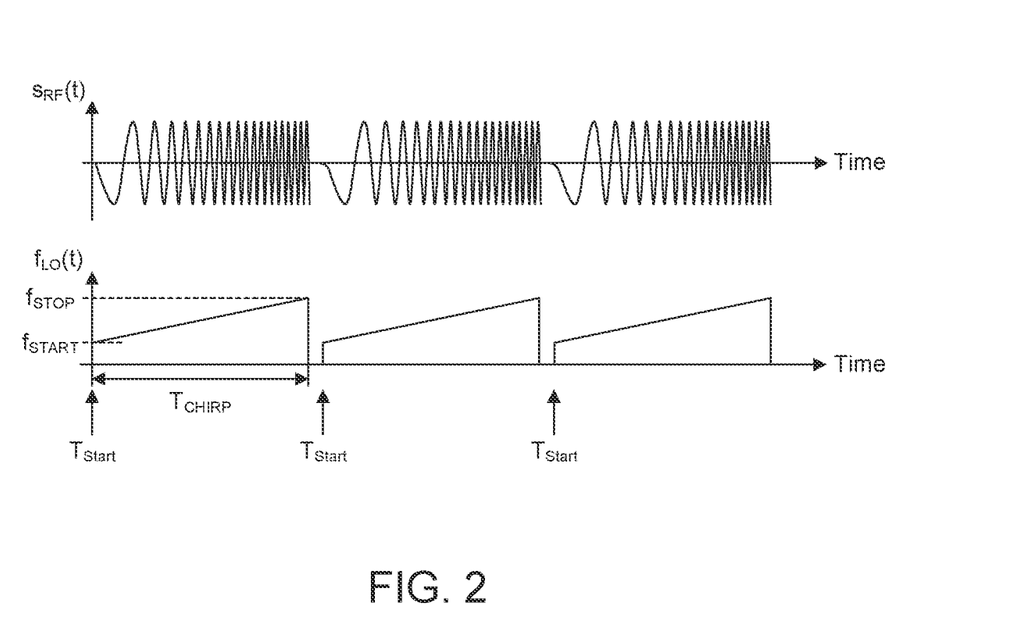
FIG. 2 includes two timing diagrams illustrating the frequency modulation of the radio frequency (RF) signal used in FMCW radar systems according to one or more embodiments.

FIG. 2 includes two timing diagrams illustrating the frequency modulation of the RF signal $S_{RF}(t)$ used in FMCW radar systems. As shown in FIG. 2, the signal $S_{RF}(t)$ may be composed of a plurality of frequency ramps or "chirps", that is to say the signal $S_{RF}(t)$ comprises a sequence of sinusoidal signal profiles (waveforms) with rising frequency (up-chirp) or falling frequency (down-chirp). In the present example, the instantaneous frequency $f_{LO}(t)$ of a chirp increases linearly, starting at a start frequency $f_{START}$ to a stop frequency $f_{STOP}$ within a time interval $T_{CHIRP}$. Such chirps are also referred to as linear frequency ramps.

A frequency-modulated ramp signal, such as local oscillator signal used for generating a radar signal, may include a plurality of radar frames which may also be referred to as radar operation cycles or chirp frames. A sequence of ramps may make up each a radar frame. For example, a radar operation cycle may include several hundreds of radar ramps (sweeps) taking up to 10-30 ms in total. A frame length of the radar frame corresponds to one radar operation cycle. It is also to be noted that consecutive ramps have a short pause therebetween and a longer pause may be used between consecutive radar frames. The longer pause between consecutive radar frames may be referred to as a configuration interval during which one or more ramp parameters of the RF signal $S_{RF}(t)$ can be adjusted for subsequent radar frames. A ramp start time $T_{START}$ indicates a start time for each chirp and may be a predetermined interval according to, for example, a number of clock cycles.

It will be appreciated that the start frequency $f_{START}$ and stop frequency $f_{STOP}$ of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies $f_{START}$ and $f_{STOP}$ may be smaller than the usable radar frequency band. However, all ramps that are generated during operation lie between the frequencies Fmin and Fmax of the radar frequency band (e.g., between 76-81 GHz) used for generating the ramping signals.

FIG. 2 illustrates three identical linear frequency ramps or chirps. It is noted, however, that the parameters $f_{START}$, $f_{STOP}$, $T_{CHIRP}$ as well as the pause between the individual frequency ramps may vary dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time $T_{CHIRP}$. Furthermore, in other embodiments the center frequency of each ramp (and therefore $f_{START}$ and $f_{STOP}$) may vary (e.g. from ramp to ramp or after detecting an interference) to allow using the full or a part of the frequency band. In one example, the frequency band has a minimum frequency Fmin of 76 GHz and a maximum frequency Fmax of 81 GHz.

Figure 3:
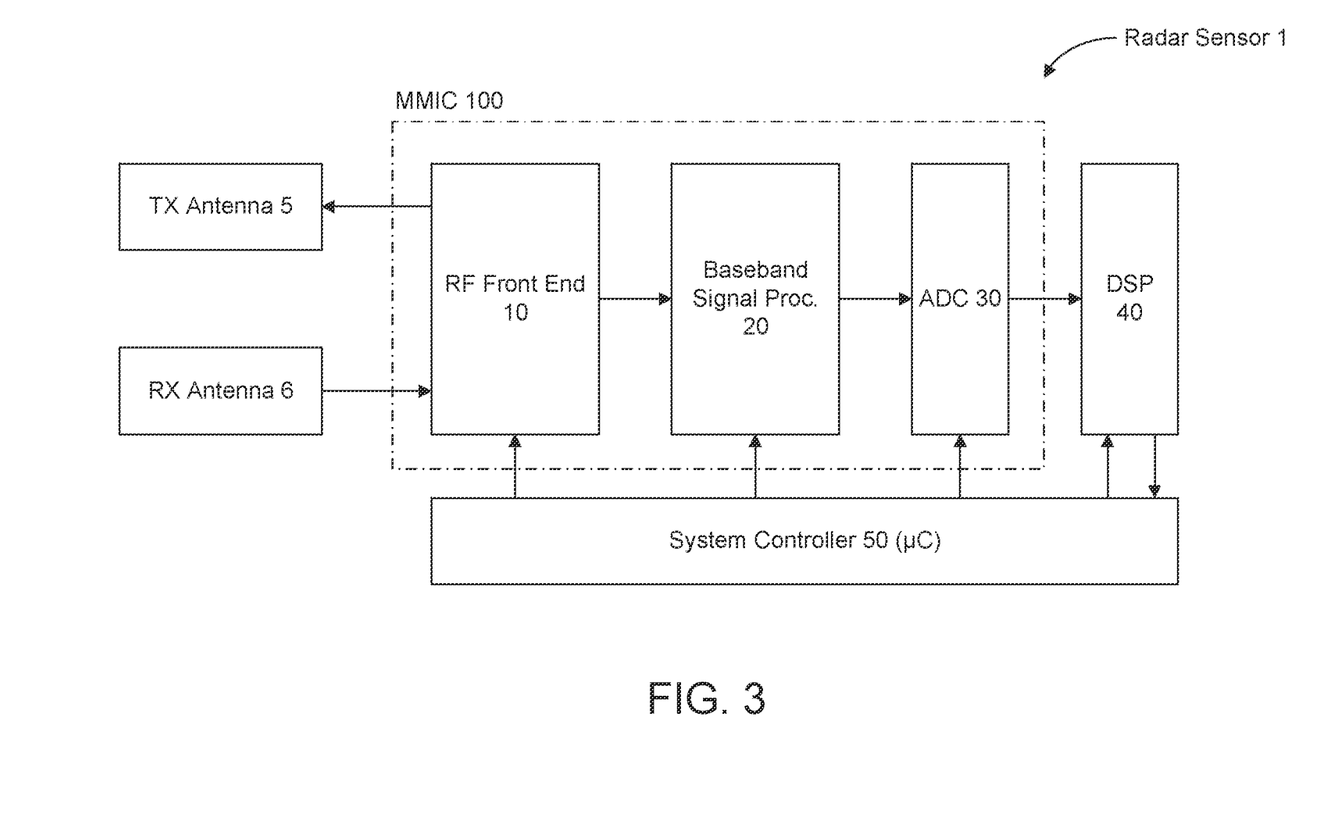
FIG. 3 is a block diagram illustrating the basic structure of an FMCW radar device according to one or more embodiments.

Thus, while three identical linear frequency ramps or chirps with the same start frequency $f_{START}$ and stop frequency $f_{STOP}$ are illustrated in FIG. 2, it is contemplated that the start frequency $f_{START}$ and stop frequency $f_{STOP}$ may vary within a radar frame or across multiple radar frames. A local oscillator signal $S_{LO}(t)$ is used to generate the RF signal $S_{RF}(t)$. Thus, is can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ is a frequency-modulated ramp signal that includes a plurality of frequency ramps each starting at a respective ramp start frequency and ending at a respective ramp stop frequency and the respective ramp start frequencies and the respective ramp stop frequencies of the plurality of frequency ramps define a frequency range within the bounds of the operating frequency range. The frequency range of the plurality of frequency ramps is defined by the lowest start frequency $f_{START}$ and the highest stop frequency $f_{STOP}$ among the frequency ramps in a given time interval. As noted above, the start frequency $f_{START}$ and the stop frequency $f_{STOP}$ of a sequence of frequency ramps may be the same and thus the center frequency of each ramp may be constant. Alternatively, the center frequency of each ramp (and therefore $f_{START}$ and $f_{STOP}$) may vary from ramp to ramp or after detecting an interference. The bandwidth (i.e., frequency range) of each ramp may also vary from ramp to ramp or after detecting an interference FIG. 3 is a block diagram that illustrates an exemplary structure of a radar device 1 (radar sensor). It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC) 100.

The RF frontend 10 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion (demodulation) of RF signals (e.g., the received signal $y_{RF}(t)$, see FIG. 1) into the baseband or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a FMCW radar system, the transmitted RF signals radiated by the TX antenna 5 are in the range between approximately 20 GHz and 100 GHz (e.g. in the frequency band 21 to 26 GHz or in the frequency band 76 to 81 GHz). As mentioned, the RF signal $y_{RF}(t)$ received by the RX antenna 6 includes the radar echoes, i.e., the signal back-scattered at the so-called radar targets.

The received RF signals $y_{RF}(t)$ are down-converted into the baseband (IF band) and further processed in the baseband using analog signal processing (see FIG. 3, baseband signal processing chain 20), which basically includes filtering and amplification of the baseband signal. The baseband signal may also be referred to as analog radar data. It will be appreciated that if the received RF signals are down-converted into the IF band, the baseband signal processing chain 20 may be referred to as an IF signal processing chain. Thus, the analog baseband signal processing chain 20, in general, may also be referred to as an analog signal processing chain 20. The baseband signal is finally digitized using one or more analog-to-digital converters (ADC) 30 and further processed in the digital domain (see FIG. 3, digital signal processing chain implemented, e.g., in digital signal processor (DSP) 40). Thus, the ADC 30 is configured to generate a digital signal y(k) from the down-converted baseband signal.

The RF frontend 10 and the analog baseband signal processing chain 20 may be integrated in a single MMIC 100. Optionally, the ADC 30 may also be integrated in the MMIC 100 and outputs the digital signal y(k) to the DSP 40 for further processing. The ADC 30 may part of a digital front end (DFE) circuit of the MMIC 100 that includes additional circuitry that performs digital processing on the digital signal before outputting the digital signal y(k) from the MIMIC 100 as the digital radar data.

The digital signal y(k) is representative of the radar data received in the RF signal $y_{RF}(t)$ and is further output from the digital data output terminal $D_{OUT}$ as a digital output signal, and provided to the DSP 40 that is external to the MMIC 100.

The overall system is controlled by a system controller 50 (e.g., a microcontroller), which may be at least partly implemented using a processor executing appropriate firmware. The processor may be included, e.g., in a microcontroller, a digital signal processor, or the like. The DSP 40 may be part of the system controller 50 or separate therefrom. The signal processor and system controller may be integrated in an application specific integrated circuit (ASIC). The DSP 40 may be configured to receive the digital radar data in the digital signal y(k) and process the digital radar data using the ramp parameters (e.g. respective ramp start frequencies, the respective ramp stop frequencies, a bandwidth of the first frequency range, a ramp start time, or a sampling start time) used to generate the respective frequency ramps of the RF signal $y_{RF}(t)$ in order to generate a range doppler map, which may then be further used by the DSP 40 for object detection, classification, and so on.

While the RF frontend 10 and the analog baseband signal processing chain 20 (and optionally the ADC 30) may be integrated in a single MMIC, the components shown in FIG. 3 may be distributed among two or more integrated circuits. Particularly, some parts of the digital signal processing may be done in the MMIC 100.

Figure 4:
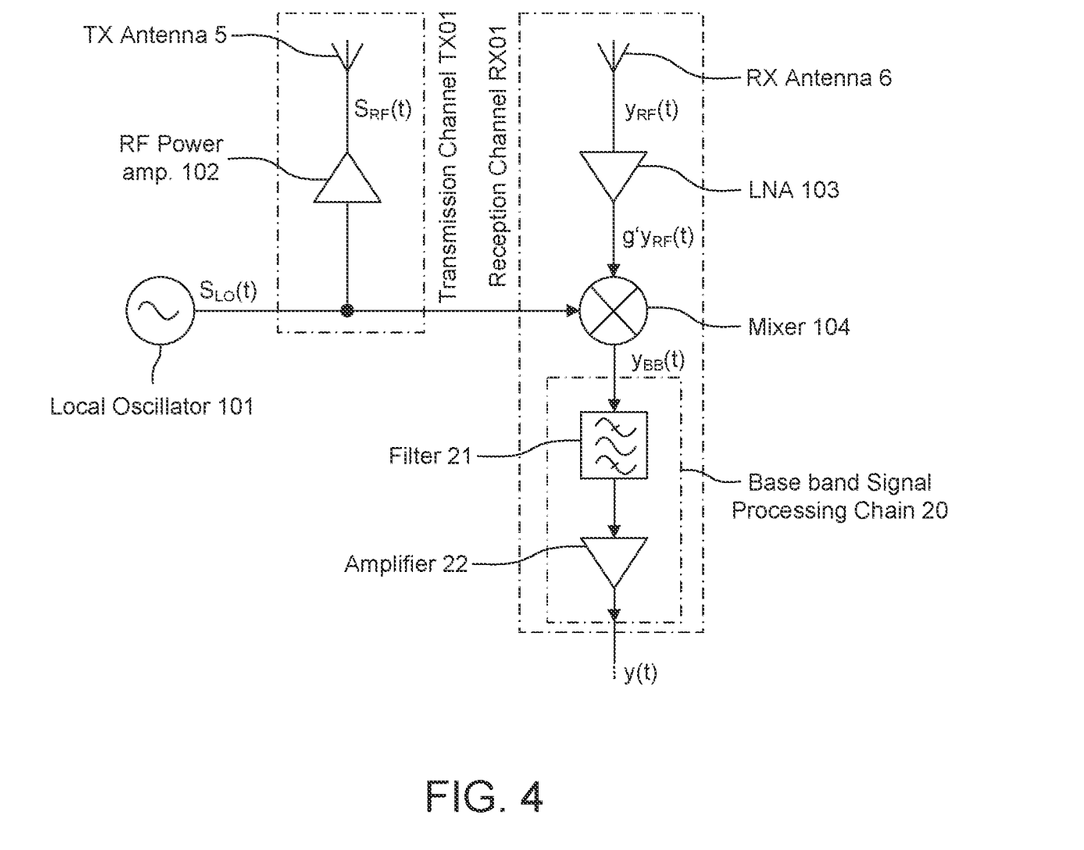
FIG. 4 is a circuit diagram illustrating one example of an analog RF frontend, which may be included in the FMCW radar device of FIG. 3 according to one or more embodiments.

FIG. 4 illustrates one exemplary implementation of the RF frontend 10, which may be included in the radar sensor 1 shown in FIG. 3. It is noted that FIG. 4 is a simplified circuit diagram illustrating the basic structure of the RF frontend. Actual implementations, which may heavily depend on the application, are of course more complex and include several RX and/or TX channels. The RF frontend 10 includes a transmission channel TX01 and a reception channel RX01. While only one transmission channel and one reception channel are shown, the MIMIC 100 may include multiple transmission channels and/or multiple reception channels with similar components.

The RF frontend 10 includes a local oscillator (LO) 101 that generates an RF signal $S_{LO}(t)$, which may be the frequency-modulated ramp signal as explained above with reference to FIG. 2 having a modulated frequency $f_{LO}(t)$. For this reason, the local oscillator 101 may also be referred to as a ramp signal generator. The RF signal $S_{LO}(t)$ is also referred to as LO signal or a reference signal. In radar applications, the LO signal is usually in the SHF (Super High Frequency) or the EHF (Extremely High Frequency) band, e.g., between 76 GHz and 81 GHz in automotive applications. The LO signal may also be generated at a lower frequency and then up-converted using frequency multiplication units. The local oscillator 101 may be part of a phase-locked loop (PLL) circuit from which the RF signal $S_{LO}(t)$ is output.

The LO signal $S_{LO}(t)$ is processed in the transmission signal path as well as in the receive path (i.e., in the transmission and reception channels). The transmission signal $S_{RF}(t)$ (outgoing radar signal), which is radiated by the TX antenna 5, is generated by amplifying the LO signal $S_{LO}(t)$, e.g., using an RF power amplifier 102. The output of the RF power amplifier 102 is coupled to the TX antenna 5. The power level of the RF power amplifier 102 may be set and adjusted by a controller of the MMIC 100. For example, by setting the power level of the RF power amplifier 102, the transmit power of the transmission channel may be set to a transmission power while the local oscillator 101 generates the transmission signal $S_{RF}(t)$ with the frequency ramps intended to be received as back-scattered signal $y_{RF}(t)$ for the processing of radar data. Alternatively, the transmit power of the transmission channel may be set to zero or to a reduced power level significantly lower than the transmission power via setting the power level of the RF power amplifier 102 accordingly. By doing so, the transmission channel is effectively turned off or substantially turned off so that little to no signal is received by the MMIC 100 via back-scattering.

The received signal $y_{RF}(t)$ (incoming radar signal), which is provided by the RX antenna 6, is directed to a mixer 104, which may be an LNA mixer. In the present example, the received signal $y_{RF}(t)$ (i.e., the antenna signal) is pre-amplified by RF amplifier 103 (gain g), so that the mixer receives the amplified signal $g \cdot y_{RF}(t)$ at its RF input port.

The mixer 104 further receives the LO signal $S_{LO}(t)$ at its reference input port and is configured to down-convert (e.g., demodulate) the amplified signal $g \cdot y_{RF}(t)$ into the baseband. In this case, it is converted into the baseband and the resulting baseband signal at the mixer output is denoted as $y_{BB}(t)$. In the present example, the mixer 104 down-converts the RF signal $g \cdot y_{RF}(t)$ (amplified antenna signal) into the baseband. The respective baseband signal (mixer output signal) is denoted by $y_{BB}(t)$. The down-conversion may be accomplished in a single stage (i.e., from the RF band into the baseband) or via one or more intermediate stages.

The baseband signal $y_{BB}(t)$ is further processed by the analog baseband signal processing chain 20 (see also FIG. 3), which basically includes one or more filters (e.g., a band-pass 21) to remove undesired side bands and image frequencies as well as one or more amplifiers, such as amplifier 22. The analog output signal of the baseband signal processing chain 20 is denoted as y(t) and may be supplied to an ADC 30 (see also FIG. 3). The digital signal y[k] output by the ADC 30 is referred to as digital radar signal that includes the digital radar data. It is understood that the digital radar signal is partitioned into frames that correspond to the chirp frames of the LO signal $s_{LO}(t)$, and each frame of the digital radar signal can be subdivided into a plurality of segments corresponding to the plurality of chirps in the corresponding chirp frame. One data acquisition (e.g., one measurement process) uses the acquisition of one frame of digital radar data, wherein the data acquisition is repeated at a defined (frame) repetition rate. The digital radar signal (e.g., frame by frame) may be supplied to a processor such as digital signal processor 40, which is programmed to further process the digital radar signal, e.g., by applying algorithms summarized as Range/Doppler processing. Various techniques for the digital post-processing of the digitized output signals (digital radar signal) are as such known (e.g., Range Doppler Analysis) and thus not further explained herein.

Figure 5:
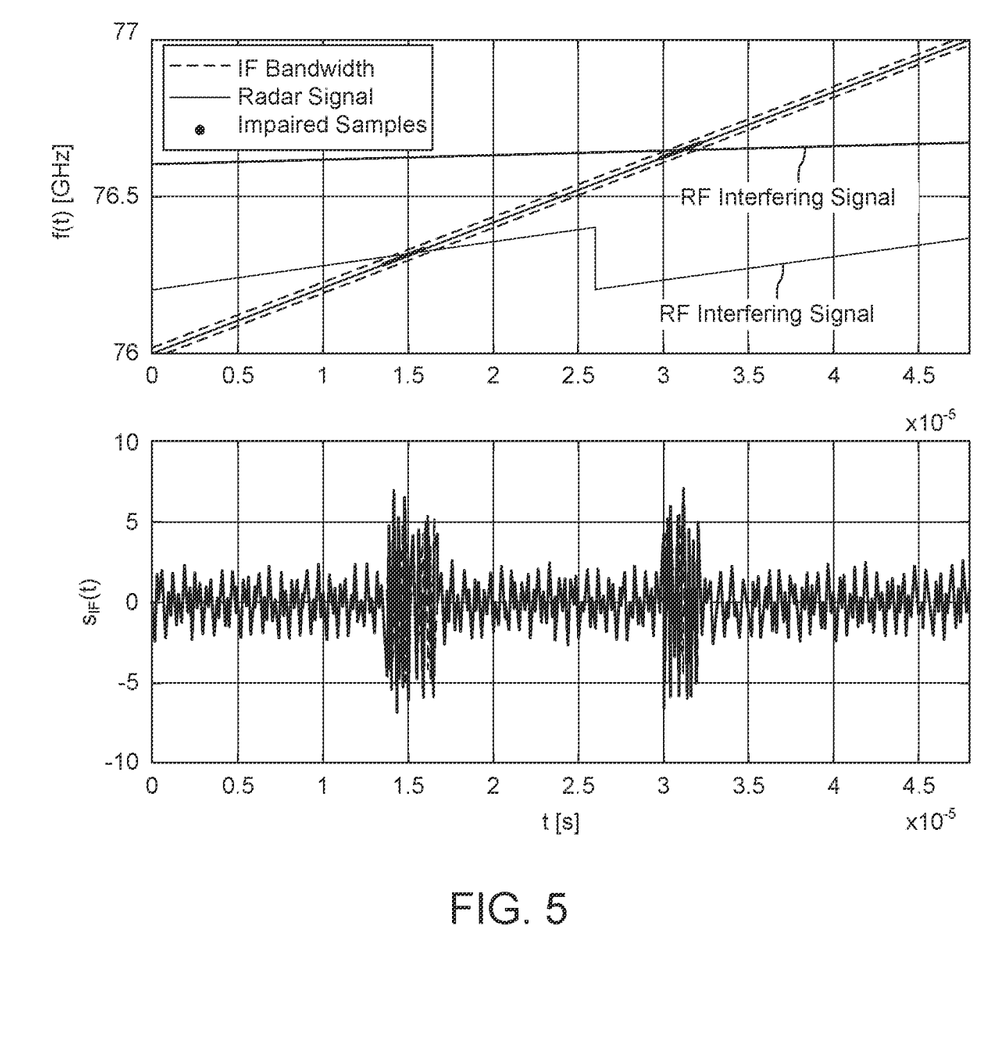
FIG. 5 illustrates a principle of signal interference due to one or more external interfering signals crossing an IF bandwidth of a radar signal according to one or more embodiments.

FIG. 5 illustrates a principle of signal interference due to one or more external interfering signals crossing an IF bandwidth of a radar signal according to one or more embodiments. The top diagram of FIG. 5 shows a radar signal received over time (t) during a radar operation from which radar data is generated and further shows two RF interfering signals that are also received during the radar operation and that which cross the IF bandwidth of the radar signal. The interfering signals impair radar samples being taken by the ADC 30 in during the period of interference. The bottom diagram of FIG. 5 shows a time diagram of the radar signal with interference. As can be seen in the bottom diagram, the interference is superimposed onto the radar signal and raises the noise floor, thereby decreasing the signal-to-noise ratio (SNR). Thus, the detection sensitivity of the radar is degraded since the SNR is lowered. In other words, the interference leads to chirp-like signals with increased signal level (i.e., increased signal power) in the IF domain, which obscures the radar data of the radar signal.

As noted above, the mixer 104 uses the LO signal $S_{LO}(t)$ received from the local oscillator 101 to down-convert the received signal $y_{RF}(t)$ into baseband signal $y_{BB}(t)$. The baseband signal $y_{BB}(t)$ is a signal that has a frequency equal to the offset frequency between the LO signal $S_{LO}(t)$ and the received signal $y_{RF}(t)$, which may be zero or near-zero. The ADC 30 is configured to sample the mixer output signal at configured sample times and provide a sequence of sampled values as digital radar data.

An interfering signal may be received while the transmission channel TX01 is actively transmitting radar signals using a normal transmission power or while the transmission channel TX01 is effectively disabled with its transmission power significantly reduced below normal transmission power. In the former case, two or more RF signals are received by the antenna 6 with the interfering signal being superimposed onto the received radar signal $y_{RF}(t)$ and leading to the superimposed signal being received at the RF input port of the mixer 104. In the latter case, the interference signal is also received by the mixer 104.

As a result, the frequency components included in the signal received by the mixer 104 from antenna 6 may change depending on whether or not an interfering signal is received by the antenna 6. Thus, the frequency components of the baseband signal $y_{BB}(t)$ may also change, leading to a higher signal level when an interfering signal is present at the RF input port of the mixer 104. In other words, the absence or the presence of an interfering signal affects whether the mixer output signal includes a baseband signal attributed to the radar signal $y_{RF}(t)$ alone, includes frequency components from an interfering signal alone, or includes frequency components from the interfering signal in addition to those of the radar signal $y_{RF}(t)$, depending on the interference monitoring scheme employed.

Figure 6:
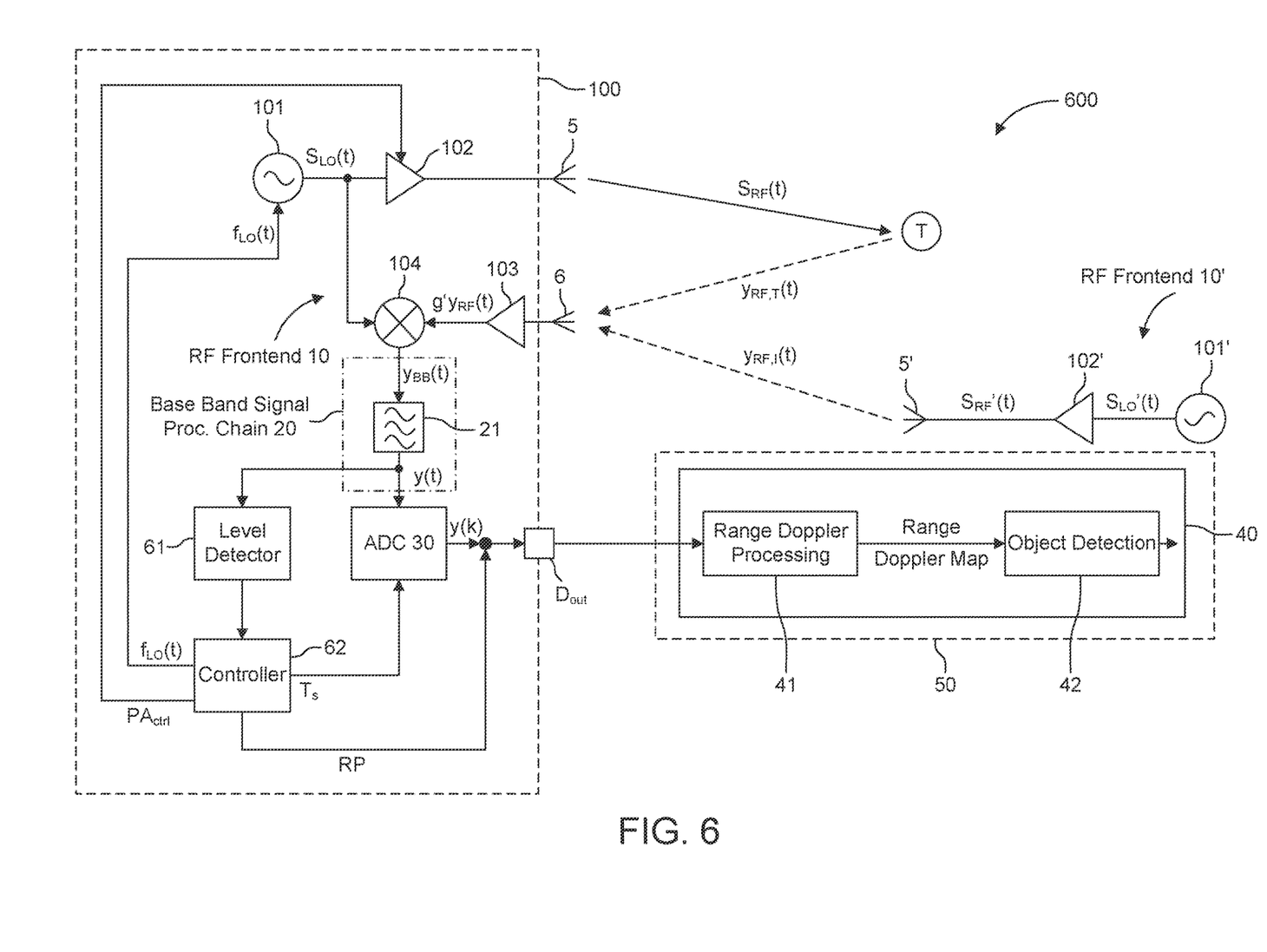
FIG. 6 illustrates one example implementation of a radar system, including radar MIMIC that further includes an interference detection and avoidance circuit according to one or more embodiments.

FIG. 6 illustrates one example implementation of a radar system 600, including radar MMIC 100 that further includes an interference detection and avoidance circuit according to one or more embodiments.

FIG. 6 also illustrates how a desired radar echo and a radar signal transmitted by another radar sensor interfere. FIG. 6 further shows the radar frontend 10' of a further radar sensor, wherein only the local oscillator 101' and the transmission channel (including amplifier 102') and the transmission antenna 5' are shown to keep the illustration simple. The further radar sensor radiates a signal $s_{RF}'(t)$. The resulting RF signal arriving at the reception antenna 6 of the radar MIMIC 100 is denoted as RF interference signal $y_{RF,I}(t)$. The reception antenna 6 of the radar MMIC 100 receives the RF interference signal $y_{RF,I}(t)$ together with the desired RF echo signal $y_{RF,T}(t)$ caused by the radar target T, from which the signal $s_{RF}(t)$ of the radar MMIC 100 is back-scattered.

Both the radar echo $y_{RF,T}(t)$ and the interference signal $y_{RF,I}(t)$ are received by the antenna 6 and superpose at the RF input of mixer 104 ($y_{RF}(t)=y_{RF,T}(t)+y_{RF,I}(t)$). It can be seen from FIG. 6 that the interference signal component $y_{RF,I}(t)$ of the received signal $y_{RF}(t)$ is down-converted into the baseband in the same way as radar echoes $y_{RF,T}(t)$ included in the received signal $y_{RF}(t)$. Accordingly, when the frequency difference between the instantaneous frequency $f_{LO}$ of the transmit signal $s_{RF}(t)$ (i.e., of the LO signal $S_{LO}(t)$) and the instantaneous frequency of the received interference signal $y_{RF,I}(t)$ lies within the bandwidth of the baseband signal processing chain 20, interference will also be present in the digital radar signal y[k].

The concept described below aims at avoiding interference by modifying one or more ramp parameters (i.e., chirp parameters), which can include the respective ramp start frequencies $f_{START}$ of the frequency ramps or chirps, the respective ramp stop frequencies $f_{STOP}$ of the frequency ramps or chirps, a bandwidth BW of the frequency range defined by the respective ramp start frequencies and the respective ramp stop frequencies, a ramp start time Tstart of respective frequency ramps or chirps, or a sampling start time used by the ADC 30 to take radar samples of the respective (received) frequency ramps or chirps.

For example, with the intention of avoiding further interference signals that cross a bandwidth of a radar signal $s_{RF}(t)$, the frequency range of the (i.e., the frequency-modulated ramp signal) may be shifted up or down within the operating frequency range (e.g., within 76-81 GHz) by adjusting the respective start frequencies $f_{START}$ of the frequency ramps. The stop frequency $f_{STOP}$ may be explicitly or implicitly adjusted. For example, the stop frequency $f_{STOP}$ may be implicitly defined by a respective start frequency $f_{START}$ and the bandwidth BW of the frequency range for the frequency ramps (e.g., $f_{STOP}=f_{START}+BW$).

Under one method, one or more ramp parameters may be adjusted during a current chirp frame of the LO signal $S_{LO}(t)$ during which one or more interference signals have been detected. Under another method, interference may be detected in a current chirp frame and the one or more ramp parameters may be adjusted in a configuration interval interposed between the current chirp frame and the next chirp frame. No chirps are generated during the configuration interval.

For the following discussion it is assumed that the local oscillator of a radar sensor can be tuned throughout a relatively large frequency band. For example, the local oscillator allows to tune the LO frequency $f_{LO}$ of the LO signal $s_{LO}(t)$ from 76 GHz to 81 GHz. That is, in the present example, the maximum frequency range or bandwidth of the radar sensor is 5 GHz. However, during normal operation, the bandwidth BW of the chirps used for a radar data acquisition may be significantly lower, for example, 1-3 GHz. This means that the "position" of the chirp bandwidth BW may be shifted within the maximum bandwidth. Ramp parameters of the LO frequency $f_{LO}$, including start frequency $f_{START}$, stop frequency $f_{STOP}$, bandwidth BW, and ramp start time Tstart can be controlled by a controller included in the MIMIC 100. The ramp parameters, which may additionally include sampling start time of the ADC 30, may be transmitted to the DSP 40 to be used for generating a range doppler map.

In addition to the RF frontend 10 discussed above in conjunction with FIG. 4, the MIMIC 100 further includes an interference detection and avoidance circuit that includes a power level detector 61 and a controller 62. In particular, the power level detector 61 is used to detect external interference signals received from the antenna 6 and the controller 62 is configured to determine based on the detected external interference signal(s) whether to adjust one or more ramp parameters RP. For example, the controller 62 may determine that the whole frequency band of the operating frequency range or a substantial portion thereof is occupied by one or more interference signals. In this case, the controller 62 may determine that there is no free ramp frequency band available to switch to and may further determine not to adjust any of the ramp parameters, as little to no interference avoidance would be realized. Alternatively, based on the detected external interference signal(s), the controller 62 may determine that at least one other ramp frequency range is available and decide to adjust one or more ramp parameters in order to attempt interference avoidance.

The controller 62 is configured to control the LO frequency $f_{LO}$ according to the start frequency $f_{START}$, the stop frequency $f_{STOP}$, the ramp bandwidth BW, and the ramp start time Tstart. The controller 62 is further configured to control the power level of the power amplifier 102 via a control signal PActrl. The controller 62 is further configured to control the sampling start time Ts of the ADC 30 as another ramp parameter. The controller 62 is further configured to transmit the ramp parameters RP to the system controller 50 (e.g., to the DSP 40). In this case, the DSP 40 is part of the system controller 50. The DSP 40 is configured to receive the ramp parameters RP from the controller 62 and process radar data received from the MIMIC 100 using ramp parameter RP to generate a range doppler map. The controller 62 may transmit updated ramp parameters RP to the DSP 40 each time a ramp parameter is adjusted for interference avoidance.

The power level detector 61 is electrically coupled to an analog signal path of the reception channel RX01 (i.e., the analog baseband signal processing chain 20) and, more particularly, to a detection node located in the analog signal path between the mixer 104 and the ADC 30. In this case, the power level detector 61 is configured to receive the filtered output signal y(t) of the mixer 104 but could also receive $y_{BB}(t)$. The power level detector 61 is configured to compare the signal level of signal y(t) to a predetermined threshold level and detect the presence of an interference signal when the signal level of signal y(t) exceeds the predetermined threshold level. In response to the signal level of signal y(t) exceeds the predetermined threshold level, the power level detector 61 is configured to generate an output pulse indicating a detection of an external interference signal (i.e., that an external inference signal was included in at least one RF signal received from the antenna 6).

The controller 62 is notified of the presence of the interference signal via the output pulse transmitted by the power level detector 61 and determines whether to adjust one or more ramp parameters and, if so, which ones. The selection of which ramp parameter(s) to adjust may be preconfigured, may be randomized, or may be deterministic based on the detected interference signal. In addition, the new setting for the selected ramp parameter(s) may likewise be preconfigured, randomized, or deterministic based on the detected interference signal. The controller 62 also notifies the DSP 40 of any adjustments made to the ramp parameters so that the DSP 40 can appropriately process digital radar data using the ramp parameters to generate a range doppler map.

Both the detection of the interference signal(s) and the adjustment of the one or more ramp parameters is performed autonomously by the power level detector 61 and the controller 62, respectively. The transmission of the one or more adjusted ramp parameters RP by the controller 62 is also performed autonomously. Depending on the interference detection scheme used, the controller 62 may decide to transmit the ramp parameters RP to the DSP 40 during a current chirp frame during which the interference is detected or during a configuration interval that immediately follows the chirp frame in which the interference was detected.

The information that the controller 62 switched to a different ramp scenario/start frequency can be either provided via Serial Peripheral Interface (SPI) communication or via metadata on low-voltage differential signaling (LVDS) or camera serial interface 2 (CSI-2) signaling to the external system controller 50. The latter is shown in the diagram above. The DSP 40 uses this information for further signal processing (range-doppler map) and object detection. That is, the controller 62 may transmit the ramp parameters RP to the digital output Dout of the MIMIC 100 where they are transmitted to the DSP 40. The ramp parameters RP may be transmitted concurrently with, sequentially with, or in parallel with the digital radar signal y(k).

The DSP 40 includes multiple processing units or processing stages, including a range doppler processing unit 41 that receives both the digital radar signal y(k) and the ramp parameters RP and processes the radar data received in the digital radar signal y(k) using the ramp parameters RP to generate a range doppler map. The DSP 40 also includes an objection detection unit 42 that receives the range doppler map and detects objects therein. Additional processing units may be provided that classify the detected objects and perform further actions based on the detected/classified objects.

One of two interference detection schemes are contemplated, including one where the power level of the power amplifier 102 is set by the controller 62 to a transmission power level and another where the power level of the power amplifier 102 is set by the controller 62 to a reduced power level such that either no reflected radar signals are received that originate from the MIMIC (i.e., no radar signal is transmitted due to a zero power level) or only low power reflected radar signals are received that originate from the MMIC 100. The low power reflected radar signals are low enough in power that they can essentially be ignored for interference detection by the power level detector 61.

In the first case, the power level of the power amplifier 102 is set to a transmission power level. As a result, RF signal $s_{RF}(t)$ is transmitted according to the frequency-modulated LO signal $s_{LO}(t)$ that has a series of frequency ramps in accordance with the configured ramp parameters. As a result of the transmitted signal $s_{RF}(t)$, RF signal $y_{RF,T}(t)$ is received at the reception channel RX01. Concurrently with the reception of RF signal $y_{RF,T}(t)$, one or more interference signals $y_{RF,I}(t)$ may also be received and superimposed onto the RF signal $y_{RF,T}(t)$ such that the mixer 104 receives a superimposed signal $(y_{RF}(t)=y_{RF,T}(t)+y_{RF,I}(t))$ having an increased power level at its RF input port. The mixer 104 uses the frequency-modulated LO signal $s_{LO}(t)$ to down-convert the superimposed signal into baseband, which is then received by the level detector 61. Due to the presence of the interference signal $y_{RF,I}(t)$, the power signal level of the filtered baseband signal y(t) exceeds the predetermined threshold level of the level detector 61 and the level detector 61 generates an output pulse indicating a detection of an interference signal.

Thus, the MIMIC 100 is configured to transmit a radar signal based on the frequency-modulated ramp signal $s_{LO}(t)$ generated by the local oscillator 101 and receive a reflected radar signal derived from the radar signal. The interference detection circuit is configured to detect the external interference signal in response to detecting a received RF signal being superimposed onto the reflected radar signal by analyzing the power level of an analog baseband signal output by mixer 104.

In the event that an interference signal is not present, the mixer receives only the RF signal $y_{RF,T}(t)$ at its RF input port $(y_{RF}(t)=y_{RF,T}(t))$. As a result, the power signal level of the filtered baseband signal y(t) is lower and does not exceed the predetermined threshold level of the level detector 61 and no output pulse is generated. Thus, the predetermined threshold level can be set to a level that in the absence of the external interference signal being superimposed onto the reflected radar signal, the signal level of the down-converted signal does not exceed the predetermined threshold level.

As noted above, the wherein the frequency-modulated ramp signal $s_{LO}(t)$ includes a plurality of frames of frequency ramps (i.e., chirp frames). Since the transmitter is actively transmitting radar signals at the transmission power level, interference signals can be detected within the same frame that the radar signals are being actively transmitted. Thus, interference avoidance can be performed in real-time by the controller 62, even within the same chirp frame during a radar operation. For example, in response to the level detector 61 detecting the external interference signal in a current chirp frame of frequency ramps, the controller 62 is configured to autonomously adjust at least one ramp parameter and autonomously transmit the at least one adjusted ramp parameter to the system controller 50 during the same, current chirp frame of frequency ramps in which the external interference signal is detected.

The system controller 50 is configured to use the adjusted ramp parameters for processing during a remaining portion of the chirp frame as well as during subsequent chirp frames as long as the ramp parameters remain unchanged. The ramp parameters may be changed by the controller 62 each time an interference signal is detected.

Figure 7:
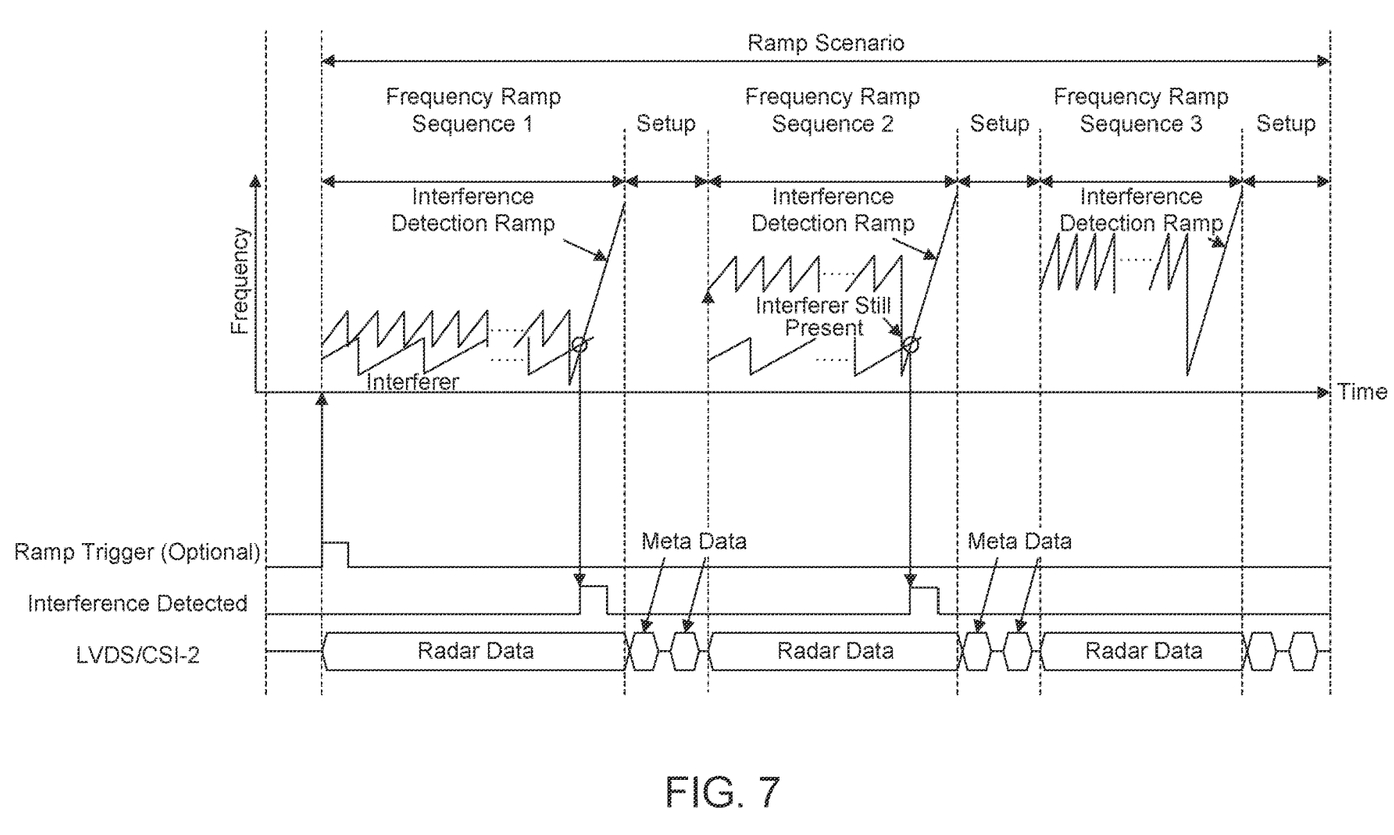
FIG. 7 illustrates a ramp scenario including three ramp sequences having an interference detection ramp at the end of each ramp sequence according to one or more embodiments.

In the second case, further illustrated in FIG. 7, the MIMIC 100 uses an interference detection ramp in the frequency-modulated ramp signal $s_{LO}(t)$ to detect interference signals. While the local oscillator 101 generates the interference detection ramp, the controller 62 sets the power level of the power amplifier 102 to zero or to a reduced power level.

FIG. 7 illustrates a ramp scenario including three ramp sequences having an interference detection ramp at the end of each ramp sequence according to one or more embodiments. The ramp sequences are also referred to as chirp frames that are separate by configuration intervals that may be used to set up ramp parameters for the next ramp sequence.

The frequency-modulated ramp signal $s_{LO}(t)$ includes a three chirp frames, where each of the chirp frames includes a sequence of frequency ramps and at least one interference detection ramp. The sequence of frequency ramps are generated while the transmitter is active (i.e., the power amplifier 102 is set to a transmission power level). Thus, RF signal $s_{RF}(t)$ is emitted by the antenna 5 with the sequence of frequency ramps amplified according to the power transmission level. The received RF signal $y_{RF,T}(t)$ is then down-converted by the mixer 104 using the sequence of frequency ramps of the frequency-modulated ramp signal $s_{LO}(t)$. In contrast, the interference detection ramp is generated while the transmitter is in an inactive or passive state (i.e., the power amplifier 102 is set to a reduced power level).

It can also be observed that the frequency range or bandwidth of the interference detection ramps is larger than the frequency range or bandwidth of the sequence of frequency ramps to cover the surrounding frequency ranges. In this way, interference signals close to or at an edge of the frequency range of the sequence of frequency ramps can be detected. Thus, the minimum frequency or start frequency of the interference detection ramps is less than the minimum frequency or start frequency of the sequence of frequency ramps and/or the maximum frequency or stop frequency of the interference detection ramps is greater than the maximum frequency or stop frequency of the sequence of frequency ramps.

Interference detection is performed during the generation of an interference detection ramps. In this case, the interference detection ramps are generated at the end of each chirp frame, subsequent to the sequence of frequency ramps, so as to not interfere with the normal radar operation.

In the event that no external interference signal is present, e.g., frequency ramp sequence 3, the mixer 104 receives little to no signal at its RF input port. Thus, the power signal level measured by the level detector 61 does not exceed its predetermined threshold level.

However, in the event that an external interference signal is present, e.g., frequency ramp sequences 1 and 2, it can intersect and therefore be superimposed onto the interference detection ramp. In particular, the signal power of the interference signal is superimposed onto the mixer output signal $y_{BB}(t)$ as it is down-converted into the baseband by the mixer 104. The mixer 104 uses the interference detection ramp of the frequency-modulated ramp signal $s_{LO}(t)$ to down-convert the interference signal and the level detector 61 evaluates the power signal level of the filtered baseband signal y(t) against the predetermined threshold level and generates an output pulse that indicates a detection of the interference signal.

After interference is detected, the controller 62 may autonomously switch to a different ramp scenario by adjusting one or more ramp parameters. In this case, an interference signal is detected in frequency ramp scenario 1 (i.e., the first chirp frame) and the controller 62 shifts the frequency range of the frequency ramps within the operating frequency range for the next frequency ramp scenario 2. It may do this by shifting the start frequency $f_{START}$ up or down. In this case, the controller 62 shifts that start frequency $f_{START}$ up for the next frequency ramp scenario 2 in an attempt to avoid the interference.

Furthermore, in response to detecting an interference signal during frequency ramp scenario 1, the controller 62 autonomously transmits the adjusted ramp parameter(s) as metadata to the DSP 40 during the configuration interval that is located between frequency ramp scenario 1 and frequency ramp scenario 2. Thus, the DSP 40 can set up for processing radar data received from the MMIC 100 in the next chirp frame (e.g., the second chirp frame).

In this example, an interference signal is also detected in frequency ramp scenario 2 (i.e., the second chirp frame) and the controller 62 shifts the bandwidth BW of the frequency ramps as well as the ramp start time Tstart of the frequency ramps for the next chirp frame (e.g., the third chirp frame). As before, these adjusted ramp parameters are transmitted by the controller 62 as metadata to the DSP 40 during the configuration interval located between frequency ramp scenario 2 and frequency ramp scenario 3 to enable the DSP 40 to properly process the radar data received from the MMIC 100 in the next chirp frame (e.g., the third chirp frame).

The above-described embodiments provide an interference avoidance scheme that is holistically controlled by a radar transceiver MIMIC. Based on sensing of the usable radar band, the MIMIC autonomously applies radar chirp parameters (ramp scenarios) that avoid interference. The selected ramp scenario is also autonomously transferred to a system controller, such as an external microcontroller.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPUs), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radar system, comprising:
   a radar semiconductor chip comprising:
      a ramp signal generator configured to generate a frequency-modulated ramp signal within a predefined radar frequency range, the frequency-modulated ramp signal comprising a plurality of frequency ramps each starting at a respective ramp start frequency and ending at a respective ramp stop frequency, wherein the respective ramp start frequencies and the respective ramp stop frequencies of the plurality of frequency ramps define a first frequency range;
      a transceiver configured to receive at least one radio frequency (RF) signal from an antenna, the transceiver comprising an interference detection circuit configured to detect an external interference signal included in the at least one RF signal, the external interference signal being within the predefined radar frequency range; and a controller configured to autonomously adjust at least one ramp parameter based on the detected external interference signal and autonomously transmit the at least one adjusted ramp parameter to a microcontroller.

2. The radar system of claim 1, wherein:
the at least one ramp parameter is the first frequency range, and
in response to detecting the external interference signal, the controller is configured to autonomously control the ramp signal generator to shift the first frequency range within the predefined radar frequency range.

3. The radar system of claim 1, further comprising:
the microcontroller, wherein the microcontroller is configured to receive the at least one adjusted ramp parameter and process radar data received from the radar semiconductor chip using the at least one adjusted ramp parameter to generate a range doppler map.

4. The radar system of claim 3, wherein the at least one ramp parameter includes at least one of the respective ramp start frequencies, the respective ramp stop frequencies, a bandwidth of the first frequency range, a ramp start time, or a sampling start time.

5. The radar system of claim 1, wherein:
the transceiver is configured to transmit a radar signal based on the frequency-modulated ramp signal and receive a reflected radar signal derived from the radar signal, and
the interference detection circuit is configured to detect the external interference signal in response to detecting a received RF signal being superimposed onto the reflected radar signal.

6. The radar system of claim 5, wherein:
the transceiver includes a reception channel configured to receive the at least one RF signal, including the reflected radar signal, down-convert the at least one RF signal into a base band as a down-converted signal using the frequency-modulated ramp signal, and generate digital radar data based on the down-converted signal, and
the interference detection circuit includes a level detector configured to receive the down-converted signal and generate an output pulse in response to a signal level of the down-converted signal exceeding a predetermined threshold level, wherein the output pulse indicates a detection of the external interference signal included in the at least one RF signal.

7. The radar system of claim 6, wherein the reception channel comprises:
a mixer configured to receive the at least one RF signal and the frequency-modulated ramp signal and down-convert the at least one RF signal into the base band as the down-converted signal using the frequency-modulated ramp signal; and
an analog-to-digital converter configured to generate the digital radar data based on the down-converted signal, wherein the level detector is coupled to a node arranged between the mixer and the analog-to-digital converter for receiving the down-converted signal therefrom.

8. The radar system of claim 6, wherein, in an absence of the external interference signal being superimposed onto the reflected radar signal, the signal level of the down-converted signal does not exceed the predetermined threshold level.

9. The radar system of claim 6, wherein the radar semiconductor chip comprises:
an output terminal coupled to the reception channel and to the controller, wherein the output terminal is configured to transmit the at least one adjusted ramp parameter with the digital radar data to the microcontroller.

10. The radar system of claim 9, further comprising:
the microcontroller, wherein the microcontroller is configured to receive the digital radar data and the at least one adjusted ramp parameter and process the digital radar data using the at least one adjusted ramp parameter to generate a range doppler map.

11. The radar system of claim 6, wherein the ramp signal generator comprises a local oscillator configured to generate the frequency-modulated ramp signal, wherein the frequency-modulated ramp signal includes a plurality of frames of frequency ramps, and
wherein, in response to the interference detection circuit detecting the external interference signal in a current frame of frequency ramps, the controller is configured to autonomously adjust the at least one ramp parameter and autonomously transmit the at least one adjusted ramp parameter to the microcontroller during the current frame of frequency ramps in which the external interference signal is detected.

12. The radar system of claim 11, wherein the controller is configured to use the at least one adjusted ramp parameter for the ramp signal generator in subsequent frames of frequency ramps at least until a next external interference signal is detected.

13. The radar system of claim 1,
wherein the frequency-modulated ramp signal includes a plurality of frames, each of the plurality of frames includes a sequence of frequency ramps and at least one interference detection ramp, the sequence of frequency ramps having the first frequency range,
the transceiver includes a reception channel configured to receive the at least one RF signal and down-convert the at least one RF signal into a base band as a first down-converted signal using the at least one interference detection ramp,
the interference detection circuit is configured to detect the external interference signal in response to detecting a received RF signal being superimposed onto the at least one interference detection ramp.

14. The radar system of claim 13, wherein, in response to detecting the external interference signal in a current frame of the frequency-modulated ramp signal, the controller is configured to autonomously adjust the at least one ramp parameter for a next frame of the frequency-modulated ramp signal and autonomously transmit the at least one adjusted ramp parameter to the microcontroller to be used by the microcontroller for the next frame of the frequency-modulated ramp signal.

15. The radar system of claim 14, further comprising:
the microcontroller, wherein the microcontroller is configured to receive the at least one adjusted ramp parameter and process radar data received from the radar semiconductor chip using the at least one adjusted ramp parameter to generate a range doppler map.

16. The radar system of claim 14, wherein consecutive frames of the frequency-modulated ramp signal are separated by a configuration interval, and the controller is configured to transmit the at least one adjusted ramp parameter to the microcontroller in the configuration interval interposed between the current frame in which the external interference signal is detected and the next frame.

17. The radar system of claim 16, further comprising: the microcontroller, wherein:
the transceiver is configured to transmit a radar signal based on the sequence of frequency ramps and receive a reflected radar signal derived from the radar signal,
the reception channel is configured to receive the reflected radar signal, down-convert the reflected radar signal into a base band as a second down-converted signal using the sequence of frequency ramps, generate digital radar data based on the second down-converted signal, and transmit the digital radar data to the microcontroller, and
the microcontroller is configured to receive the digital radar data of the next frame and process digital radar data using the at least one adjusted ramp parameter received in the configuration interval preceding the next frame to generate a range doppler map.

18. The radar system of claim 13, wherein the transceiver comprises a transmission channel whose transmit power is set to a transmission power while the ramp signal generator generates the sequence of frequency ramps and is set to zero or to a reduced power level lower than the transmission power while the ramp signal generator generates the at least one interference detection ramp.

19. The radar system of claim 13, wherein the interference detection circuit includes a level detector configured to receive the first down-converted signal and generate an output pulse in response to a signal level of the first down-converted signal exceeding a predetermined threshold level, wherein the output pulse indicates a detection of the external interference signal included in the at least one RF signal.

20. The radar system of claim 13, wherein the at least one interference detection ramp has a second frequency range greater than the first frequency range.

21. The radar system of claim 1, wherein the frequency-modulated ramp signal is a frequency-modulated continuous-wave (FMCW) signal.

22. The radar system of claim 1, wherein the microcontroller is external to the radar semiconductor chip.

23. The radar system of claim 1, wherein the controller is configured to determine whether or not to adjust at least one ramp parameter in response to detecting the external interference signal.

24. A method of detecting external interference signals in a radio frequency (RF) circuit, the method comprising:
generating, by a radar semiconductor chip, a frequency-modulated ramp signal within a predefined radar frequency range, the frequency-modulated ramp signal comprising a plurality of frequency ramps each starting at a respective ramp start frequency and ending at a respective ramp stop frequency, wherein the ramp start frequencies and the ramp stop frequencies of the plurality of frequency ramps define a first frequency range;
receiving, by the radar semiconductor chip, at least one RF signal from an antenna;
detecting, by the radar semiconductor chip, an external interference signal included in the at least one RF signal, the external interference signal being within the predefined radar frequency range;
autonomously adjusting, by the radar semiconductor chip, at least one ramp parameter based on the detected external interference signal; and
autonomously transmitting, by the radar semiconductor chip, the at least one adjusted ramp parameter to a microcontroller.

* * * * *